United States Patent
Chang et al.

(10) Patent No.: US 9,838,615 B2
(45) Date of Patent: Dec. 5, 2017

(54) IMAGE EDITING METHOD AND ELECTRONIC DEVICE USING THE SAME

(71) Applicant: HTC Corporation, Taoyuan (TW)

(72) Inventors: Ruey-Jer Chang, Taoyuan (TW); Zih-Ci Lin, Taoyuan (TW); Wei-Chung Yang, Taoyuan (TW); Chun-Hsiang Huang, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 14/645,437

(22) Filed: Mar. 12, 2015

(65) Prior Publication Data

US 2015/0341564 A1    Nov. 26, 2015

(30) Foreign Application Priority Data

May 22, 2014    (TW) .............................. 103117941 A

(51) Int. Cl.
| | |
|---|---|
| *H04N 5/262* | (2006.01) |
| *H04N 5/232* | (2006.01) |
| *G06T 11/60* | (2006.01) |

(52) U.S. Cl.
CPC ............. *H04N 5/262* (2013.01); *G06T 11/60* (2013.01); *H04N 5/23229* (2013.01); *H04N 5/23293* (2013.01); *H04N 5/2621* (2013.01)

(58) Field of Classification Search
CPC ............... H04N 5/262; H04N 5/23293; H04N 5/23229; G06T 11/60
See application file for complete search history.

(56) References Cited

U.S. PATENT DOCUMENTS

| | | | | |
|---|---|---|---|---|
| 7,623,733 | B2 * | 11/2009 | Hirosawa | H04N 5/272 348/222.1 |
| 8,615,111 | B2 * | 12/2013 | Garten | G06T 5/005 382/107 |
| 2008/0187234 | A1 * | 8/2008 | Watanabe | H04N 1/3876 382/254 |
| 2011/0103644 | A1 | 5/2011 | Garten | |
| 2012/0127074 | A1 | 5/2012 | Nakamura et al. | |

(Continued)

FOREIGN PATENT DOCUMENTS

| | | |
|---|---|---|
| TW | 201104494 | 2/2011 |
| TW | 201304529 | 1/2013 |

(Continued)

OTHER PUBLICATIONS

"Office Action of Taiwan Counterpart Application," dated Sep. 23, 2015, p. 1-p. 12.

(Continued)

*Primary Examiner* — Padma Haliyur
(74) *Attorney, Agent, or Firm* — JCIPRNET

(57) ABSTRACT

An image editing method and an electronic device including a display unit are provided. In the method, a first image is captured and displayed on the display unit. A first object is extracted from the first image, and a second object in the first image is detected. A second image is captured and the second object in the second image is detected. A movement of the second object is obtained according to the first image and the second image, and the first object on the display unit is moved along with the movement of the second object. Accordingly, an object in a photo can be moved by using images.

16 Claims, 10 Drawing Sheets

(56) References Cited

U.S. PATENT DOCUMENTS

2014/0101578 A1 4/2014 Kwak et al.
2014/0104316 A1 4/2014 Sharma et al.
2014/0325439 A1* 10/2014 Sohn .................. G06F 3/04883
　　　　　　　　　　　　　　　　　　　715/810

FOREIGN PATENT DOCUMENTS

| TW | 201309008 | 2/2013 |
| TW | 201327358 | 7/2013 |
| TW | 201411552 | 3/2014 |

OTHER PUBLICATIONS

"Office Action of China Counterpart Application," dated Aug. 25, 2017, pp. p1-p6, in which the listed reference was cited.

* cited by examiner

IMAGE EDITING METHOD AND ELECTRONIC DEVICE USING THE SAME

CROSS-REFERENCE TO RELATED APPLICATION

This application claims the priority benefit of Taiwan application serial no. 103117941, filed on May 22, 2014. The entirety of the above-mentioned patent application is hereby incorporated by reference herein and made a part of this specification.

BACKGROUND

Field of the Invention

The application relates to an image method and more particularly relates to an image editing method for moving an object and an electronic device using the method.

Description of Related Art

As the technology in fabrication of photosensitive elements and lenses advances, many devices available in the market are now provided with image or video capturing functions. For instance, the general users are getting used to using smart phones, in addition to cameras, for taking pictures. When taking pictures, the user may need some functions to improve the image quality or make fun for taking pictures. For example, the user may want to adjust the brightness, add an effect such as a scar to the face, or convert a colored picture into a black and white one. However, these functions may not be available at the moment of taking the pictures and are required to be done by post-image processing. Therefore, how to provide the user an interactive interface when the user takes pictures for the user to capture pictures with different effects is an important issue in this field.

SUMMARY

The embodiments of the application provide an image editing method and an electronic device, which provide an interactive interface when the user takes a picture and allow the user to take a picture with an object therein moved.

The application provides an image editing method, adapted for an electronic device including a display unit. The image editing method includes: capturing a first image and displaying the first image on the display unit; extracting a first object from the first image; detecting a second object in the first image; capturing a second image and detecting the second object in the second image; obtaining a movement of the second object according to the first image and the second image; and moving the first object on the display unit along with the movement of the second object.

In an exemplary embodiment, the step of extracting the first object from the first image includes: detecting an operation of a user, wherein the operation defines an area in the first image; and extracting the first object from the area.

In an exemplary embodiment, the image editing method further includes: determining whether the second object touches the first object; and executing the step of moving the first object on the display unit along with the movement of the second object if the second object touches the first object.

In an exemplary embodiment, the step of determining whether the second object touches the first object includes: selecting a touch area of the first object; determining whether the second object overlaps the touch area; and determining that the second object touches the first object if the second object overlaps the touch area.

In an exemplary embodiment, the step of moving the first object along with the movement of the second object further includes: repairing a blank portion that is generated in the first image after the first object is moved.

In an exemplary embodiment, the step of repairing the blank portion includes: obtaining a third image related to the first object through a network; and repairing the blank portion based on the third image.

In an exemplary embodiment, the first object occupies the entirety of the first image, and the step of moving the first object along with the movement of the second object includes: rotating the first object along with the movement of the second object.

In an exemplary embodiment, the image editing method further includes: determining whether a scene is changed according to the first image and the second image; and combining the first object with the changed scene and displaying the combined image on the display unit if the scene is changed.

An embodiment of the application provides an electronic device, which includes an image capturing unit, a display unit, and a processor. The processor is coupled to the display unit and the image capturing unit for capturing a first image through the image capturing unit, and the display unit is configured to display the first image. The processor is configured to extract a first object from the first image and detect a second object in the first image. The processor is further configured to capture a second image through the image capturing unit and detect the second object in the second image. The processor is configured to obtain a movement of the second object according to the first image and the second image and move the first object on the display unit along with the movement of the second object.

In an exemplary embodiment, the processor is further configured to detect an operation of a user, and the operation defines an area in the first image. The processor is further configured to extract the first object from the area.

In an exemplary embodiment, the processor is further configured to determine whether the second object touches the first object. The processor moves the first object on the display unit along with the movement of the second object if the processor determines that the second object touches the first object.

In an exemplary embodiment, the processor is further configured to select a touch area of the first object and determine whether the second object overlaps the touch area. The processor further determines that the second object touches the first object if the second object overlaps the touch area.

In an exemplary embodiment, the processor is further configured to repair a blank portion that is generated in the first image after the first object is moved.

In an exemplary embodiment, the processor is further configured to obtain a third image related to the first object through a network and repair the blank portion based on the third image.

In an exemplary embodiment, the first object occupies the entirety of the first image, and the processor is configured to rotate the first object along with the movement of the second object.

In an exemplary embodiment, the processor is further configured to determine whether a scene is changed according to the first image and the second image. The processor is configured to combine the first object with the changed scene and display the combined image on the display unit if the scene is changed.

Based on the above, the image editing method and the electronic device using the method provided by the embodiments of the application allow the user to move the object in the first image when the user captures the image. Accordingly, the captured image looks like that the object is actually moved.

To make the aforementioned and other features and advantages of the application more comprehensible, several embodiments accompanied with drawings are described in detail as follows.

BRIEF DESCRIPTION OF THE DRAWINGS

The accompanying drawings are included to provide a further understanding of the application, and are incorporated in and constitute a part of this specification. The drawings illustrate exemplary embodiments of the application and, together with the description, serve to explain the principles of the application.

DESCRIPTION OF THE EMBODIMENTS

First Embodiment

Figure 1:
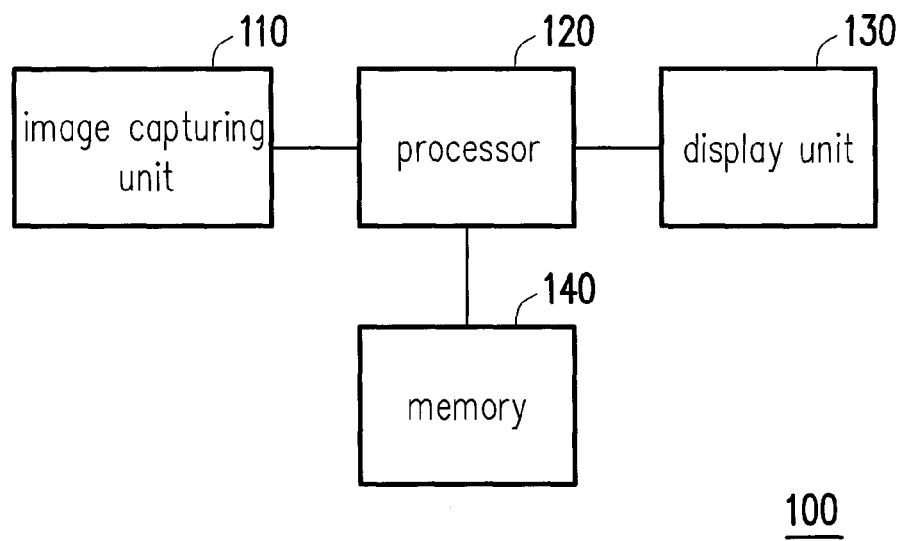
FIG. 1 is a partial block diagram of an electronic device according to an embodiment of the application.

FIG. 1 is a partial block diagram of an electronic device according to an embodiment of the application.

With reference to FIG. 1, an electronic device 100 includes an image capturing unit 110, a processor 120, a display unit 130, and a memory 140. The electronic device 100 may be implemented as a smart phone, a tablet computer, a digital camera, a digital video recorder, or any type of embedded system. In addition, the electronic device 100 may include other components such as a communication module or a power supply. It is noted that the application is not limited to the above.

The image capturing unit 110 is configured to capture an image. For example, the image capturing unit 110 includes an optical fixed-focus lens or an optical zoom lens and a photosensitive element such as a charge coupled device (CCD) or a complementary metal-oxide semiconductor (CMOS) device.

The processor 120 is a central processing unit (CPU), a microprocessor, a digital signal processor (DSP), or a graphics processing unit (GPU), for example.

The display unit 130 is configured to display a plurality of pixels. The display unit 130 may include a liquid crystal display (LCD), a light-emitting diode display (LED), a field emission display (FED), or other types of displays, for example. In this embodiment, the display unit 130 further includes a resistive or capacitive touch panel for providing both display and touch functions. However, the application is not limited thereto. The display unit 130 may not include the touch panel.

The memory 140 stores a plurality of commands therein to be executed by the processor 120. The memory 140 may be a random access memory or a flash memory. However, the application is not limited to the above.

Figure 2:
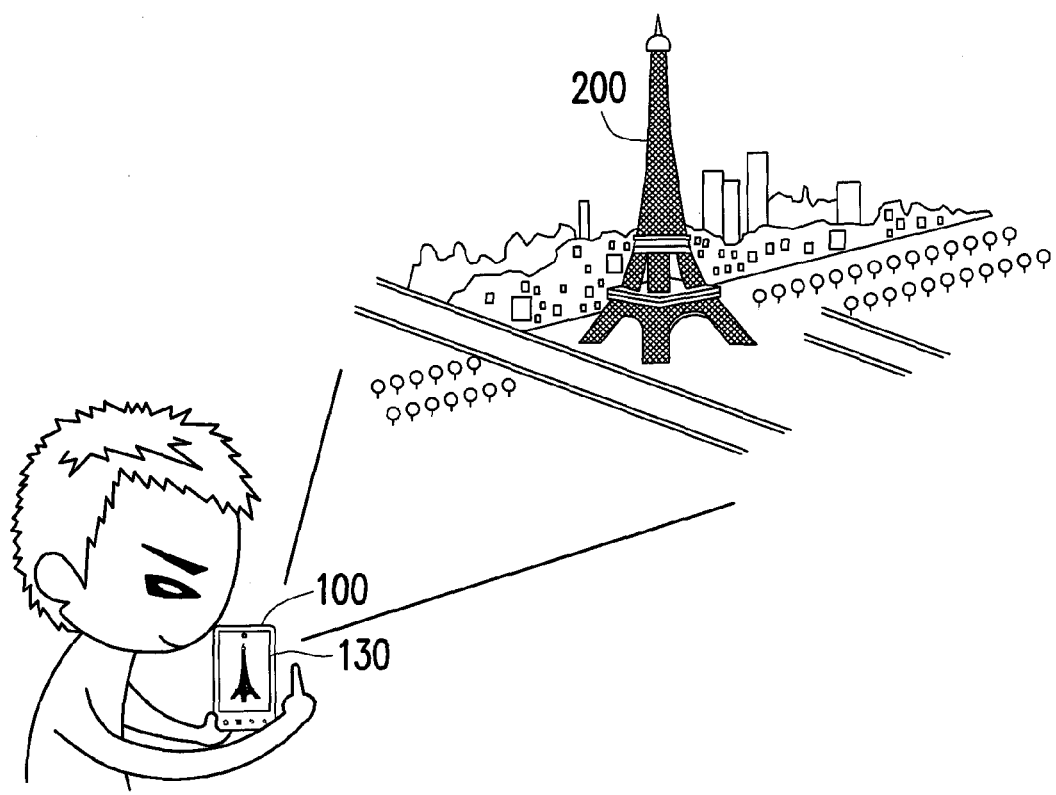
FIG. 2 is a schematic diagram of capturing an image according to an embodiment of the application.

FIG. 2 is a schematic diagram of capturing an image according to an embodiment of the application.

With reference to FIG. 2, when the user intends to take a picture, the image capturing unit 110 continuously captures images (also called "preview images") and those images are displayed on the display unit 130. The user may determine an angle and a timing of taking the picture according to the displayed image. In particular, the user may move an object in the image to generate an effect the user desires. For example, the user may put his hand between the electronic device 100 and an iron tower 200 and "push" the iron tower 200 with his hand, so that the display unit 130 displays an image of the iron tower 200 being pushed down. Accordingly, the user obtains a picture showing the iron tower 200 being pushed down.

FIG. 3A to FIG. 3D are schematic diagrams of moving an object according to an embodiment of the application.

Figure 3A:
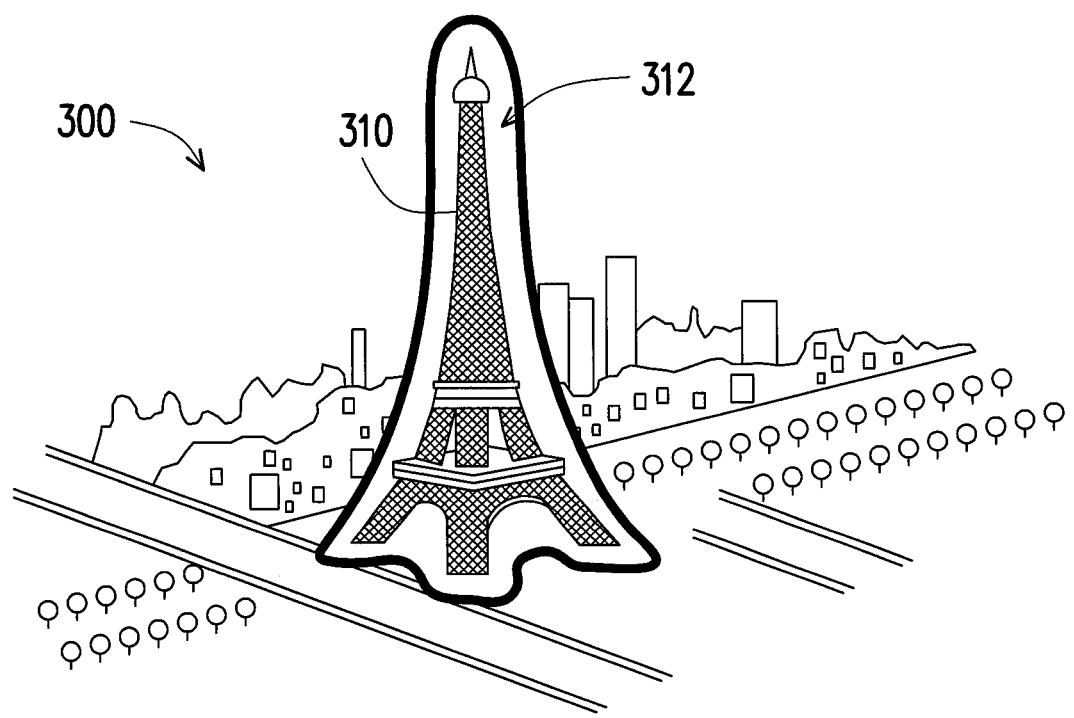
FIG. 3A to FIG. 3D are schematic diagrams of moving an object according to an embodiment of the application.

With reference to FIG. 3A, the image capturing unit 110 captures an image 300 and the image 300 is displayed on the display unit 120. The processor 120 first extracts an object 310 (also referred to as a first object) from the image 300. For example, the display unit 130 detects a touch operation of the user and allows the user to circle and select the object 310 on the display unit 130, so as to define an area 312 on the preview image 300. The processor 120 extracts the object 310 in the area 312. In an embodiment, the processor 120 extracts the object 310 by an image segmentation algorithm; however, the processor 120 may also extract the object 310 by an algorithm of edge detection or object detection, but the application is not limited to the above. In another embodiment, the processor 120 may identify all pixels in the area 312 as the object 310. Alternatively, the processor 120 may directly execute the image segmentation algorithm, the object detection algorithm, or a foreground extraction algorithm to extract the object 310 without the touch operation of the user. The processor 120 may automatically recognize a landmark, a building, a sign, or a vehicle in the preview image 300 as the object that is to be moved. The application is not intended to limit how the object 310 is extracted or limit the content of the object 310.

Figure 3B:
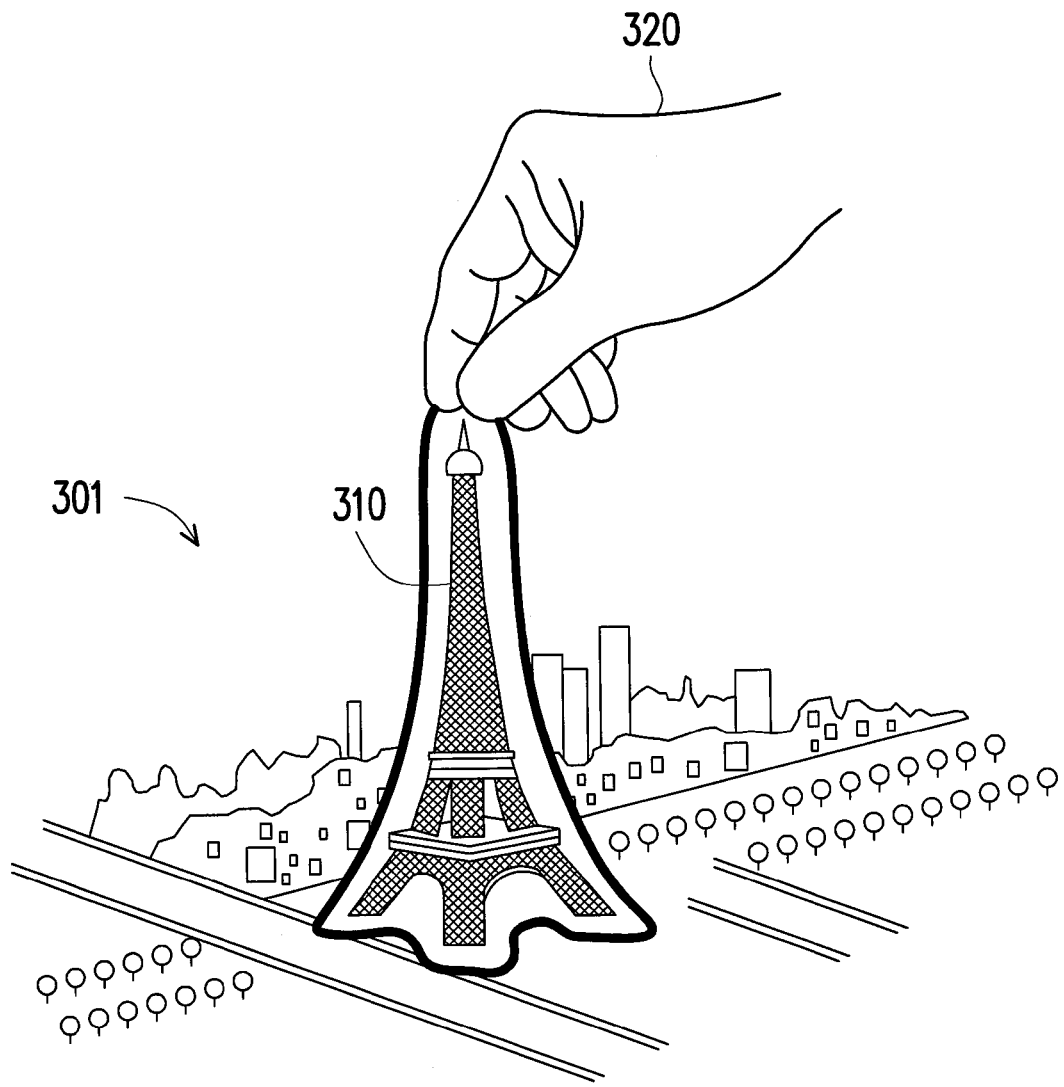

With reference to FIG. 3B, next, the image capturing unit 110 captures a first image 301, and the first image 301 is displayed on the display unit 120 as well. Similar to the above, the processor 120 extracts the object 310 in the first image 301. Moreover, the processor 120 detects an object 320 (also referred to as a second object) in the first image 301. In this embodiment, the object 320 is a hand of the user, and the processor 120 detects the object 320 by a skin color or a shape of the hand. Nevertheless, in another embodiment, the processor 120 may detect a pen or any predefined object, but the application is not limited to the above.

In an embodiment, the image capturing unit 110 further captures a second image, and the second image is not necessarily displayed on the display unit 130. The processor 120 detects the object 320 in the second image, and the processor 120 obtains a movement of the object 320 according to the first image 301 and the second image. Then, the processor 120 moves the object 310 on the display unit 120 according to the movement of the object 320. Accordingly, the user may see the iron tower is moved on the display unit 130.

In an embodiment, the step of moving the object 310 is triggered by a preset condition. The preset condition is to determine whether the object 320 touches the object 310, for example. If the object 320 touches the object 310, the object 310 is moved. On the other hand, if the object 320 does not touch the object 310, the object 310 remains unmoved regardless of the movement of the object 320. However, the application is not limited to the above preset condition. The processor 120 may determine whether the object 320 touches the object 310 according to positions of the objects 310 and 320 or a specific part thereof. For example, the processor 120 selects a touch area of the object 310, and this touch area may be a point, a line, an edge or a profile of the object 310. The processor 120 determines whether the object 320 overlaps the touch area. If the result is YES, the processor 120 determines that the object 320 touches the object 310. In the embodiment of FIG. 3B, the touch area occupies the entirety of the object 310; however, in another embodiment, the touch area may be a top end or any part of the object 310, but the application is not limited to the above. In another embodiment, the processor 120 may select a touch area (e.g. a fingertip or a tip of a pen) of the object 320, and when the touch area of the object 320 overlaps the touch area of the object 310, the processor 120 determines that the object 320 touches the object 310. It should be noted that the image capturing unit 110 constantly captures images as the preview images. That is to say, the processor 120 constantly detects the object 320 and determines whether the object 320 touches the object 310. In another embodiment, the processor 120 may track the position of the object 320 and determine whether the two objects 310 and 320 touch each other based on the positions of the objects 310 and 320. Here it is given that the object 310 touches the object 320.

Figure 3C:
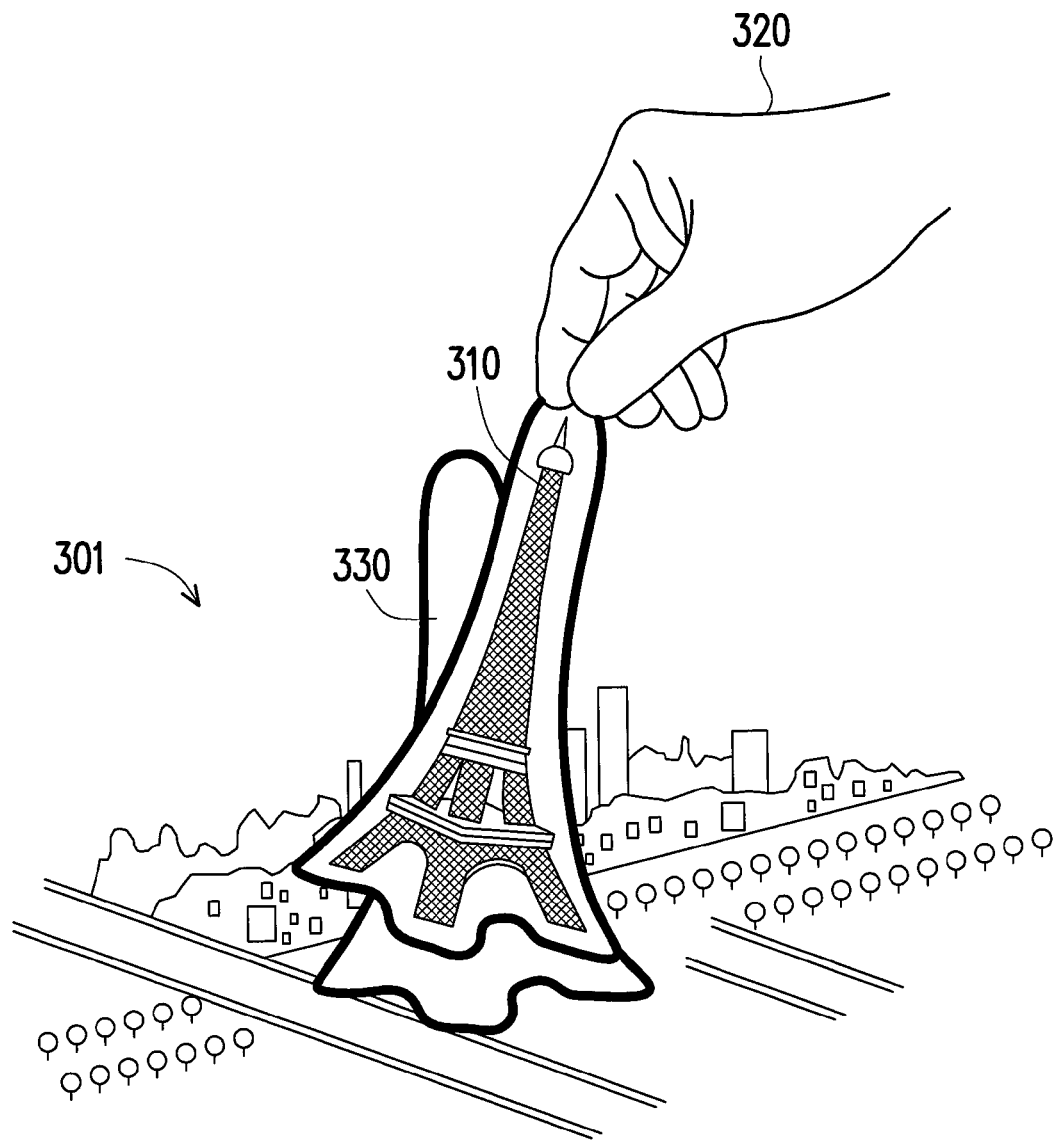

With reference to FIG. 3C, then, the image capturing unit 110 continues to capture the second image, and the processor 120 detects the object 320 in the second image. In this embodiment, after the object 310 and the object 320 touch each other, the first image 301 becomes a still image and is continuously displayed on the display unit 130. The processor 120 renews the object 320 according to the second image but does not renew a background. In addition, the processor 120 obtains the movement of the object 320 according to the first image 301 and the second image and moves the object 310 along with the movement of the object 320. In FIG. 3C, the object 310 tilts to the right along with the object 320. However, in another embodiment, the processor 120 may cause the object 310 to move horizontally or vertically, change size, rotate, bend, duplicate, or be cut into a plurality of sub-objects along with the movement of the object 320. Here, the description of "moving the object 310" includes the aforementioned various forms, but the application is not limited thereto.

Figure 3D:
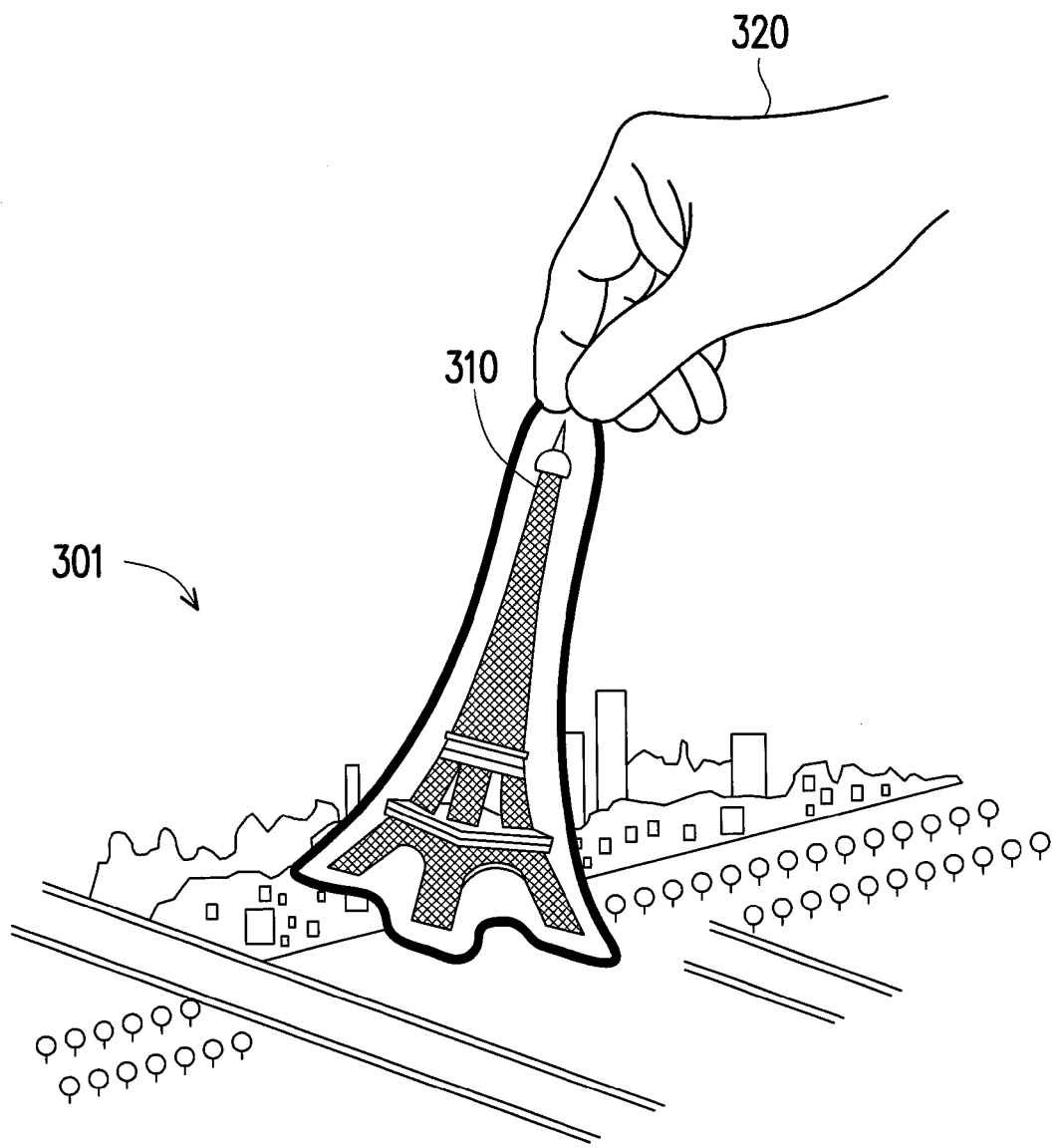

It should be noted that, after the object 310 is moved, a blank portion 330 is generated in the first image 301. In this embodiment, the processor 120 may repair the blank portion 330 (as shown in FIG. 3D), but the application is not limited to the above. The processor 120 may not repair the blank portion 330. The processor 120 may repair the blank portion 330 by any image inpainting algorithm. Alternatively, the processor 120 may obtain one or a plurality of images related to the object 310 from a network through a communication module (not shown) of the electronic device 100 and repair the blank portion 330 based on the images. For example, the object 310 is a famous landmark. Therefore, the processor 120 may search for images of this landmark from the Internet. The images include a foreground and a background of the object 310, and the processor 120 may repair the blank portion 330 based on the background.

After the object 310 is moved, the user may press a capturing button such that the processor 120 stores the current first image 301 in the electronic device 100 (e.g. stored in the memory 140 or a secure digital (SD) card). It should be noted that the capturing button may be a physical button (not shown) on the electronic device 100 or a graphic interface displayed on the display unit 130, but the application is not limited thereto. In another embodiment, the processor 120 may automatically store the current first image 301, and the application does not limit when the first image 301 is stored.

In the above embodiment, when the object 310 and the object 320 touch each other, the first image 301 becomes a still image. However, in other embodiments, when the object 310 and the object 320 touch each other, the image capturing unit 110 may renew a portion of the first image 301 excluding the object 310, based on the second image. Alternatively, the processor 120 may renew the object 310 based on the new second images, but the application is not limited to the above.

Figure 4A:
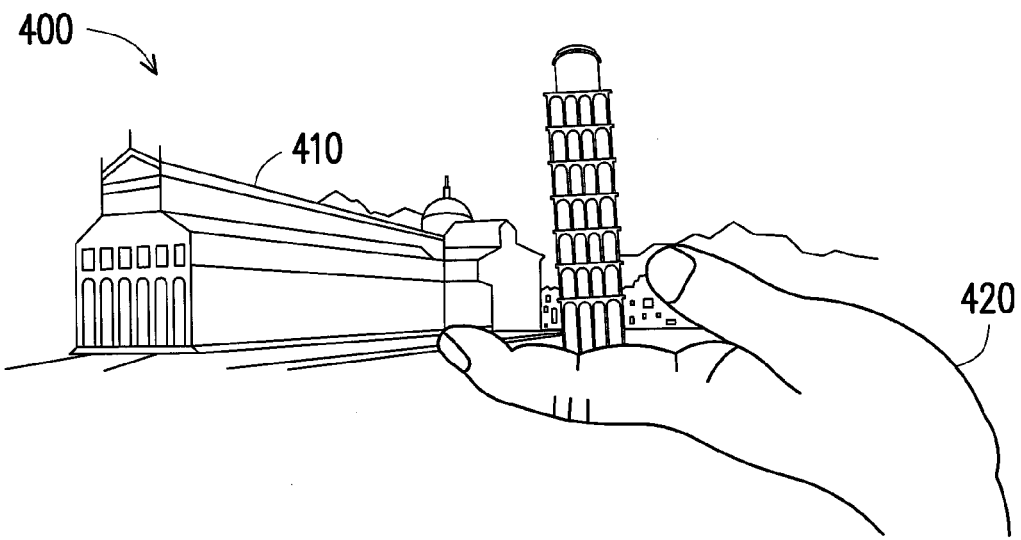
FIG. 4A to FIG. 4C are schematic diagrams of rotating an object according to an embodiment of the application.
Figure 4B:
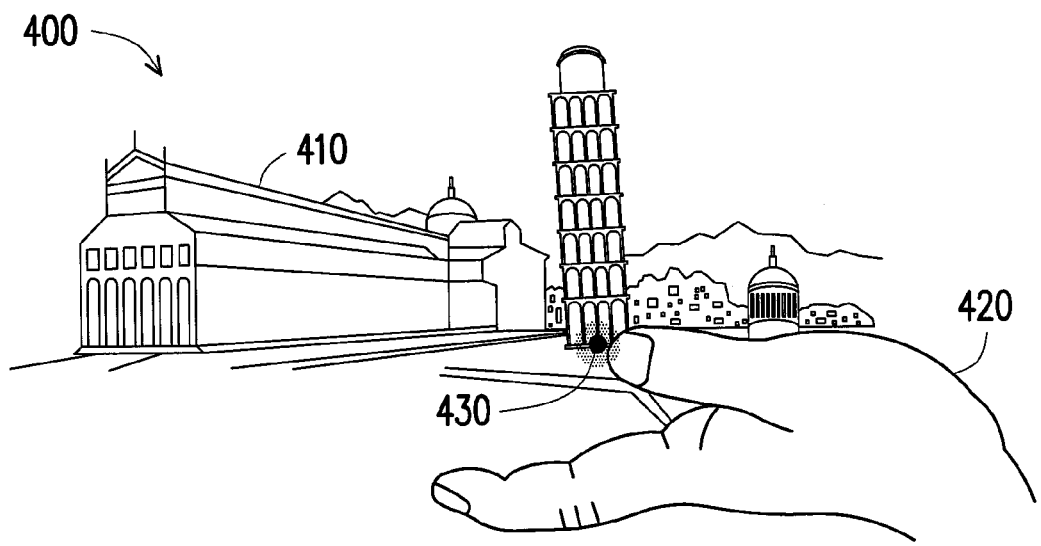
Figure 4C:
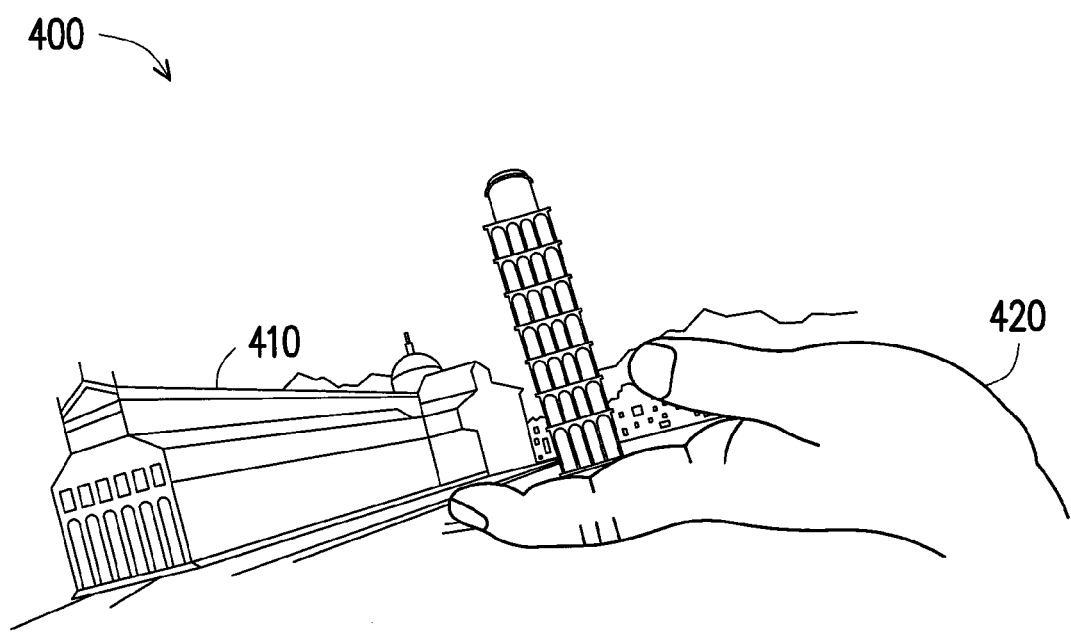

FIG. 4A to FIG. 4C are schematic diagrams of rotating an object according to an embodiment of the application.

With reference to FIG. 4A, in the embodiment of FIG. 4A, an object 410 selected by the user occupies the entirety of an image 400. Thus, after an object 420 touches the object 410, the entire image 400 is moved along with the object 420. For example, in FIG. 4B, the processor 120 determines that the object 420 has left a touch area 430, and thus the processor 120 rotates the object 410 along with the movement of the object 420 (as shown in FIG. 4C) and renews the image 400 accordingly. After rotating the object 410, the processor 120 cuts a portion of the object 410 to generate an image to be displayed on the display unit 130. Alternatively, the processor 120 may reduce the size of the object 410 and repair the blank portion, but the application is not limited to the above.

Figure 5:
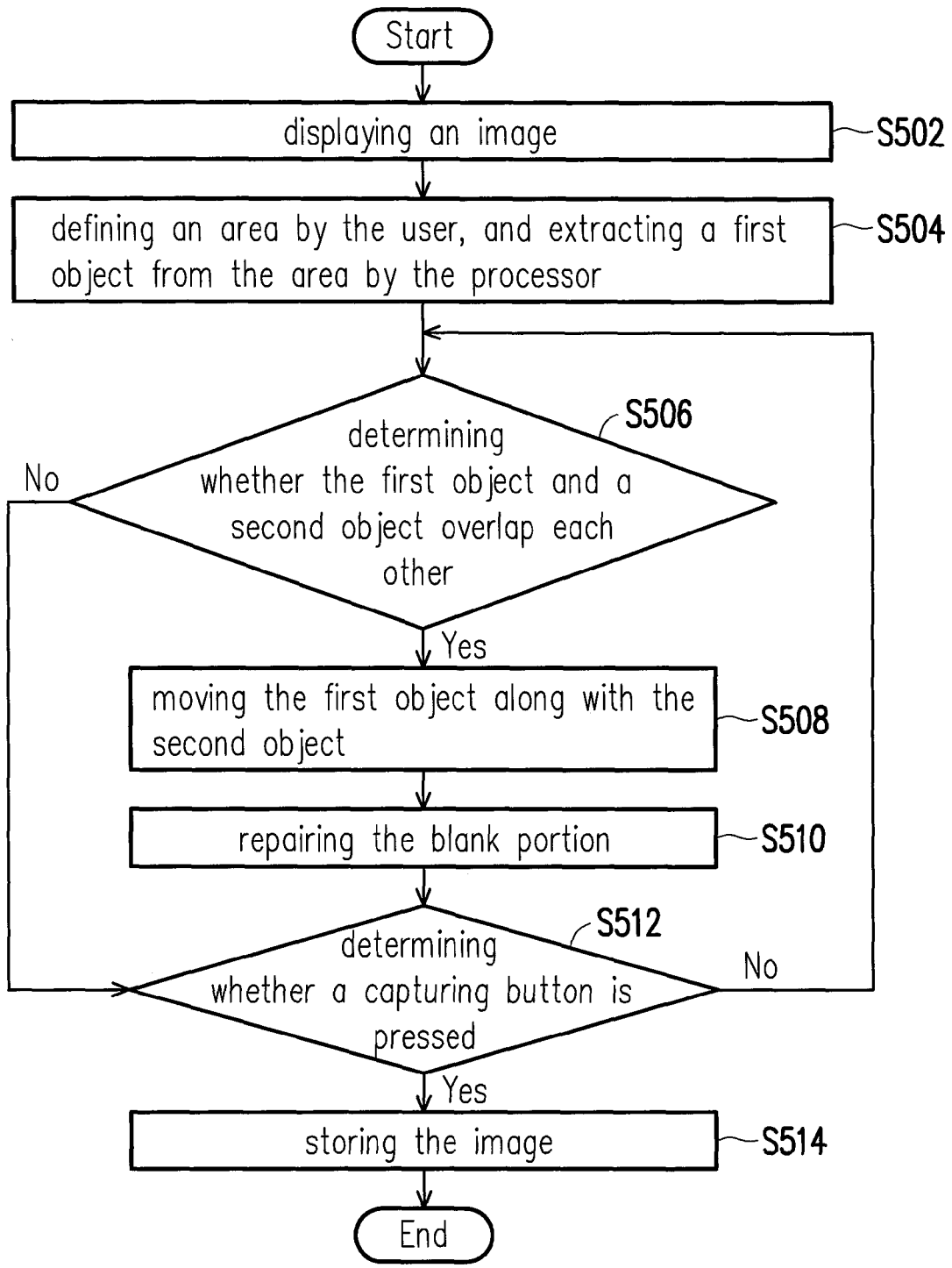
FIG. 5 is a flowchart of moving an object according to the first embodiment of the application.

FIG. 5 is a flowchart of moving an object according to the first embodiment of the application.

With reference to FIG. 5, in Step S502, the processor 120 displays an image on the display unit 130. In Step S504, an area is defined by the user, and the processor 120 extracts a first object from this area. In Step S506, the processor 120 determines whether the first object and a second object overlap each other.

If the result of Step S506 is YES, the processor 120 moves the first object along with the second object (Step S508) and repairs the blank portion (Step S510).

In Step S512, the processor 120 determines whether a capturing button is pressed. If the result of Step S512 is YES, the processor 120 stores the current image in Step S514.

Each step of FIG. 5 has been specified as above and thus is not repeated hereinafter.

Second Embodiment

The second embodiment is similar to the first embodiment, and therefore the following paragraphs only describe a difference between the first embodiment and the second embodiment.

Reverting to FIG. 3D, in the second embodiment, the user may move the electronic device 100 to change the current scene. For example, after the processor 120 moves the object 310, the user may move the electronic device 100, and at the moment, the image capturing unit 110 continues to capture new images. The processor 120 extracts at least two new images at different time points from these new images. The processor 120 determines whether a difference between the two new images is greater than a threshold. If the difference is greater than the threshold, the processor 120 determines that the scene is changed. Alternatively, the electronic device 100 is disposed with a gravity sensor. The processor 120 determines whether the electronic device 100 is moved over a preset distance by the gravity sensor. If the electronic device 100 is moved over the preset distance, the processor 120 determines that the scene is changed. When the scene is changed, the processor 120 combines the object 310 with the changed scene (e.g. the current background image) and displays the combined image on the display unit 130. Accordingly, the user can "move" the object 310 to a different location (e.g. on a river) to generate another image effect.

Figure 6:
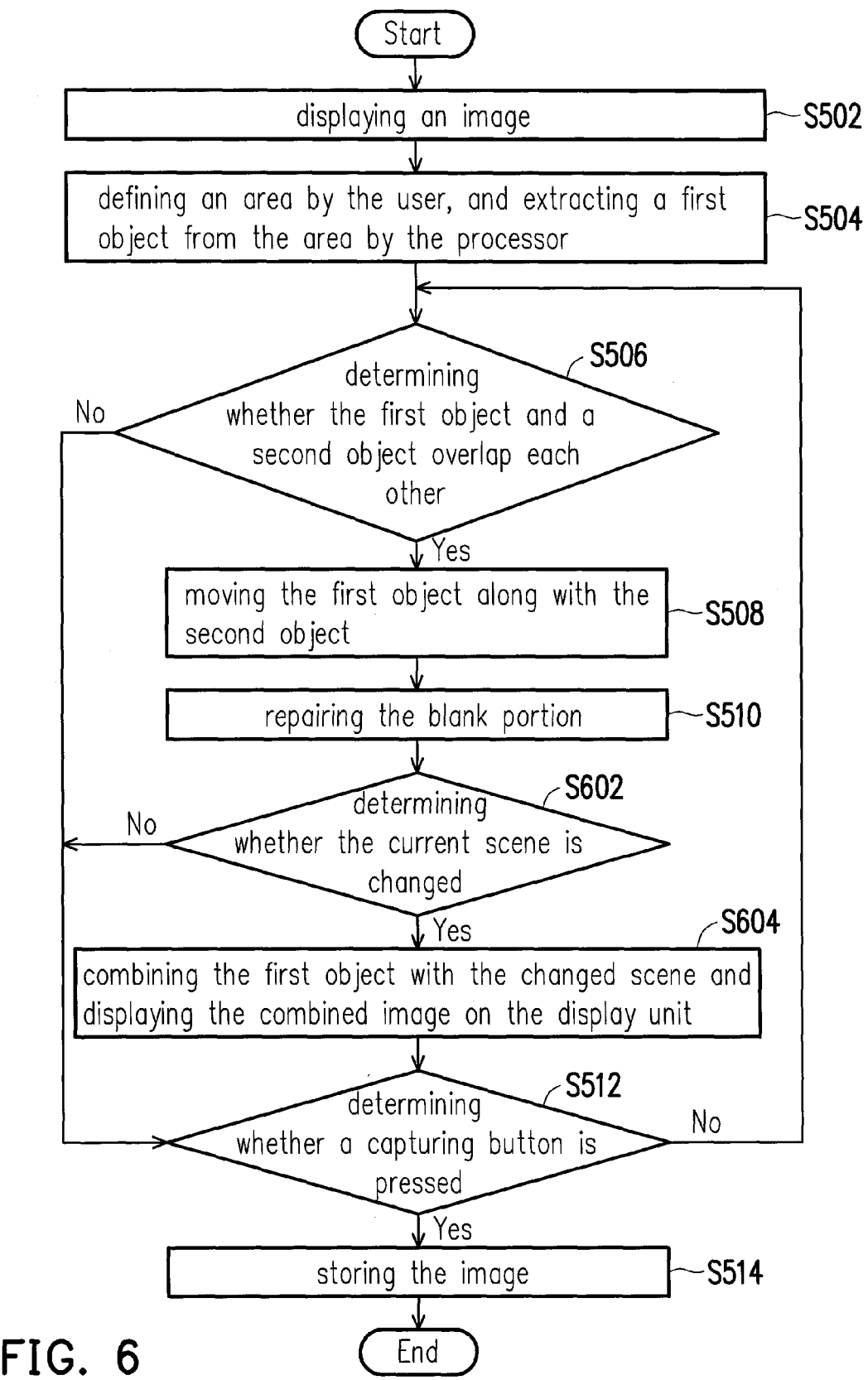
FIG. 6 is a flowchart of combining a changed scene with an object according to the second embodiment of the application.

FIG. 6 is a flowchart of combining a changed scene with an object according to the second embodiment of the application.

With reference to FIG. 6, Steps S502, S504, S506, S508, S510, S512, and S514 have been specified above and thus are not repeated hereinafter.

In Step S602, the processor 120 determines whether the current scene is changed. If the result of Step S602 is YES, the processor 120 combines the first object with the changed scene and displays the combined image on the display unit 130.

Figure 7:
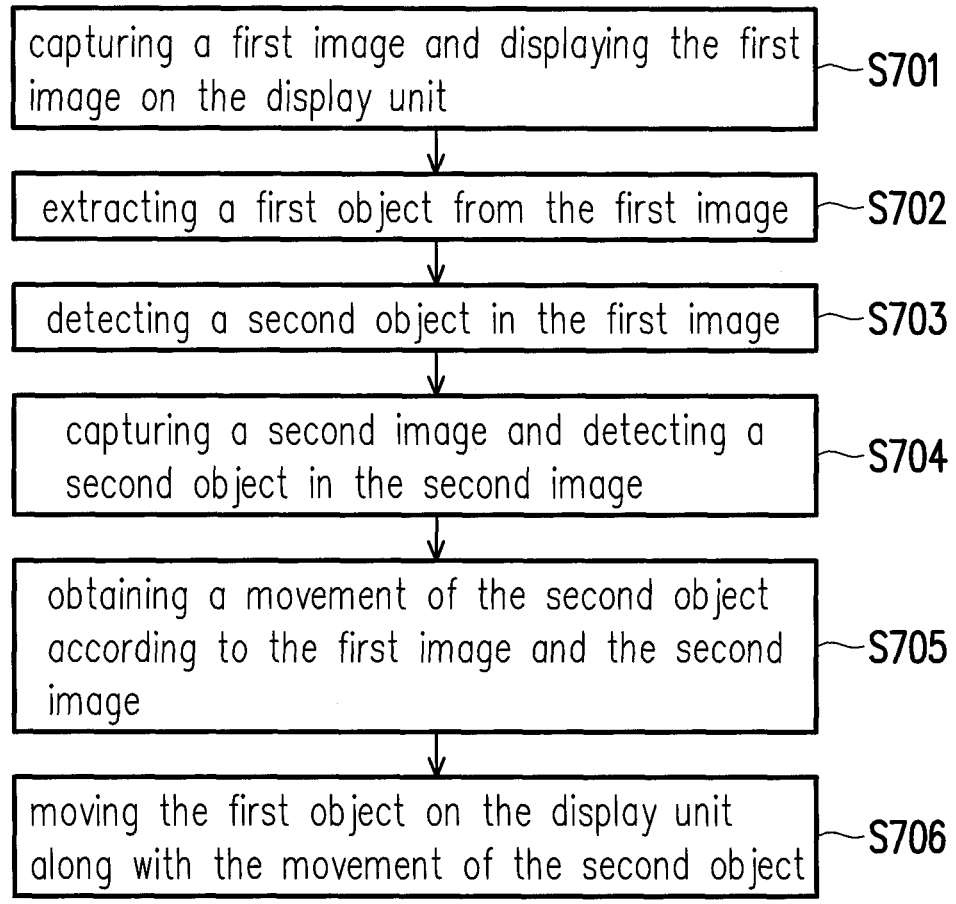
FIG. 7 is a flowchart of an image editing method according to an embodiment of the application.

FIG. 7 is a flowchart of an image editing method according to an embodiment of the application.

With reference to FIG. 7, in Step S701, a first image is captured and displayed on the display unit. In Step S702, a first object is extracted from the first image. In Step S703, a second object in the first image is detected. In Step S704, a second image is captured and the second object in the second image is detected. In Step S705, a movement of the second object is obtained according to the first image and the second image. In Step S706, the first object is moved on the display unit along with the movement of the second object.

Each step of FIG. 7 has been specified as above and thus is not repeated hereinafter. It should be understood that each step of FIG. 7 may be implemented as a plurality of program codes or circuits, and the application is not limited to the above. In addition, the method of FIG. 7 may be used in combination with the first and the second embodiments or be used solely, and the application is not limited thereto.

In conclusion of the above, the image editing method and the electronic device using the method of the embodiments of the application provide an interactive interface which allows the user to move an object when taking a picture, so as to create different image effects.

It will be apparent to those skilled in the art that various modifications and variations can be made to the disclosed embodiments without departing from the scope or spirit of the application. In view of the foregoing, it is intended that the application covers modifications and variations provided that they fall within the scope of the following claims and their equivalents.

What is claimed is:

1. An image editing method, adapted for an electronic device comprising a display, the image editing method comprising:
   capturing a first image and extracting a first object from the first image;
   capturing a plurality of second images without displaying the second images on the display while displaying the first image on the display, wherein the second images are captured after the first image;
   detecting the first object and a hand in the second images, wherein a first distance between the first object and the electronic device is greater than a second distance between the hand and the electronic device;
   determining whether the hand touches the first object in the second images;
   if the hand touches the first object in the second images, performing a first operation to renew the first object of the first image on the display according to a second operation performed by the hand in the second images; and
   storing the first image.

2. The image editing method according to claim 1, wherein the step of capturing the first image and extracting the first object from the first image comprises:
   detecting an operation of the user, wherein the operation defines an area in the first image; and
   extracting the first object from the area.

3. The image editing method according to claim 1, wherein the step of determining whether the second object touches the first object comprises:
   selecting a touch area of the first object;
   determining whether the second object overlaps the touch area; and
   determining that the second object touches the first object if the second object overlaps the touch area.

4. The image editing method according to claim 1, wherein the step of performing the first operation to renew the first object of the first image on the display according to the second operation performed by the second object in the second image comprises:
   moving a portion of the first object touched by the second object on the display to a location of the second object in the second image; and
   repairing a blank portion that is generated in the first image after the first object is moved.

5. The image editing method according to claim 4, wherein the step of repairing the blank portion comprises:
   obtaining a third image related to the first object through a network; and
   repairing the blank portion based on the third image.

6. The image editing method according to claim 4 wherein the first object occupies the entirety of the first image, and the step of moving the portion of the first object to the location of the second object in the second image comprises:
   rotating the first object according to the movement of the second object.

7. The image editing method according to claim 1, further comprising:
   determining whether a scene is changed according to the first image and the second image; and
   combining the first object with the changed scene and displaying the combined image on the display if the scene is changed.

8. An electronic device, comprising:
   an image sensor;
   a display; and
   a processor coupled to the display and the image sensor for capturing a first image and a plurality of second images through the image sensor and extracting a first image object from the first image, and the display being configured to display the first image while the second images are captured without displaying the second images on the display, wherein the second images are captured after the first image, wherein the processor is configured to detect the first object and a hand in the second images, wherein a first distance between the first object and the electronic device is greater than a second distance between the hand and the electronic device, wherein the processor is configured to determine whether the hand touches the first object in the second images, wherein the processor is configured to perform a first operation to renew the first object of the first image on the display according to a second operation performed by the hand in the second images if the processor determines that the hand touches the first object in the second images, and wherein the processor is configured to store the first image.

9. The electronic device according to claim 8, wherein the processor is further configured to detect an operation of the user, and the operation defines an area in the first image, wherein the processor is further configured to extract the first object from the area.

10. The electronic device according to claim 8, wherein the processor is further configured to select a touch area of the first object and determine whether the second object overlaps the touch area, and the processor further determines that the second object touches the first object if the second object overlaps the touch area.

11. The electronic device according to claim 8, wherein the processor is further configured to repair a blank portion that is generated in the first image after the first object is moved.

12. The electronic device according to claim 11, wherein the processor is further configured to obtain a third image related to the first object through a network and repair the blank portion based on the third image.

13. The electronic device according to claim 8, wherein the first object occupies the entirety of the first image, and the processor is configured to rotate the first object according to the movement of the second object.

14. The electronic device according to claim 8, wherein the processor is further configured to determine whether a scene is changed according to the first image and the second image, and the processor is configured to combine the first object with the changed scene and display the combined image on the display if the scene is changed.

15. The image editing method according to claim 1, wherein the first operation and the second operation include moving horizontally, moving vertically, changing size, rotating, bending, duplicating, and being cut into a plurality of sub-objects.

16. The electronic device according to claim 8, wherein the first operation and the second operation include moving horizontally, moving vertically, changing size, rotating, bending, duplicating, and being cut into a plurality of sub-objects.

* * * * *